(12) United States Patent
Ashizawa

(10) Patent No.: US 8,035,275 B2
(45) Date of Patent: Oct. 11, 2011

(54) VIBRATION ACTUATOR, LENS BARREL, CAMERA SYSTEM AND VIBRATING ELEMENT

(75) Inventor: Takatoshi Ashizawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 62 days.

(21) Appl. No.: 12/224,947

(22) PCT Filed: Mar. 9, 2007

(86) PCT No.: PCT/JP2007/054677
§ 371 (c)(1),
(2), (4) Date: Nov. 25, 2008

(87) PCT Pub. No.: WO2007/105632
PCT Pub. Date: Sep. 20, 2007

(65) Prior Publication Data
US 2009/0134745 A1 May 28, 2009

(30) Foreign Application Priority Data

Mar. 13, 2006 (JP) .................................. 2006-067233

(51) Int. Cl.
*H02N 2/00* (2006.01)
(52) U.S. Cl. .................................................. 310/323.01
(58) Field of Classification Search .................. 310/328, 310/356, 318, 353, 323.16, 316.01, 316.02, 310/323.13, 323.15, 323.06, 323.09; H02N 2/00; H01L 41/08
See application file for complete search history.

(56) References Cited

U.S. PATENT DOCUMENTS

| | | | | |
|---|---|---|---|---|
| 4,812,697 A | * | 3/1989 | Mishiro | 310/323.12 |
| 4,893,045 A | * | 1/1990 | Honda | 310/323.14 |
| 5,543,879 A | | 8/1996 | Takagi | |
| 5,777,445 A | | 7/1998 | Motegi | |
| 6,359,369 B1 | | 3/2002 | Iino et al. | |

FOREIGN PATENT DOCUMENTS

| | | |
|---|---|---|
| JP | A-07-115781 | 5/1995 |
| JP | A-09-163767 | 6/1997 |
| JP | A-2000-278970 | 10/2000 |
| JP | A-2004-187465 | 7/2004 |

* cited by examiner

*Primary Examiner* — Walter Benson
*Assistant Examiner* — Karen Addison
(74) *Attorney, Agent, or Firm* — Oliff & Berridge, PLC

(57) ABSTRACT

A vibration actuator by which stable drive can be obtained, a lens barrel, a camera system and a vibrating element are provided. In first vibration mode and second vibration mode, vibrating elements of the vibration actuator can vibrate. Resonance frequency of the second vibration mode, which is different from the first vibration mode used for driving a relatively moving member, is prevented from being same as the frequency of the higher harmonic of a driving signal.

36 Claims, 8 Drawing Sheets

VIBRATION ACTUATOR, LENS BARREL, CAMERA SYSTEM AND VIBRATING ELEMENT

TECHNICAL FIELD

The present invention relates to a vibration actuator that drives a relatively moving member and produces driving force with a vibrating element that vibrates due to a driving signal, and to a lens barrel, a camera system and a vibrating element.

BACKGROUND ART

This kind of vibration actuator is, for example, provided in an interchangeable lens of a camera or the like and utilized as a driving motor that drives an autofocusing lens. However, space for mounting a circuit that provides driving signals for driving the vibration actuator is limited. Therefore, as illustrated in Patent Document 1, it is difficult to provide ideal sine waves. Consequently, there are cases in which stable driving is not possible.

Patent Document 1: Japanese Unexamined Patent Publication No. H9-163767

SUMMARY OF THE INVENTION

Problems to be Solved by the Invention

An object of the present invention is to provide a vibration actuator, lens barrel, camera system and vibrating element that are capable of stable driving.

Means for Solving the Problems

The present invention solves the above-described problem with the following solution. Here, for ease of understanding, descriptions will be given with reference numerals corresponding to an embodiment of the present invention applied, but these are not to be limiting.

The invention according to claim 1 is a vibration actuator (10) comprising: a vibrating element (11, 11A, 11B) that vibrates due to a driving signal; and a relatively moving member (15) that performs relative motion with respect to the vibrating element due to the vibrations, wherein the vibrating element being able to vibrate in a first vibration mode, which is used for driving of the relatively moving member, and in a second vibration mode, which is a vibration mode different from the first vibration mode, and a resonance frequency of the second vibration mode does not match a frequency of a higher harmonic of a driving frequency of the driving signal for driving the vibrating element in the first vibration mode.

The invention according to claim 2 is a vibration actuator (10) according to claim 1, wherein a resonance frequency of the second vibration mode does not overlap with a region in which the frequency of the higher harmonic alters when the driving frequency is altered within a driving frequency region that is used for driving of the relatively moving member (15).

The invention according to claim 3 is a vibration actuator (10) according to claim 1 or claim 2, wherein the following relationship is satisfied $$fr2 \div m - fr1 \geq |fr3 - fr1| \times 0.4$$

(in which fr1 is a resonance frequency of the first vibration mode, fr2 is the resonance frequency of the second vibration mode, fr3 is a resonance frequency of the first vibration mode of the vibrating element neighboring fr1 at the high frequency side or low frequency side thereof, and m is an arbitrary integer).

The invention according to claim 4 is a vibration actuator (10) according to claim 3, wherein m=2.

The invention according to claim 5 is a vibration actuator (10) according to claim 3 or claim 4, wherein the following relationship is satisfied $$fr2 \div m - fr1 \geq 10 (\text{unit:kHz}).$$

The invention according to claim 6 is a vibration actuator (10) according to any one of claim 1 to claim 5, wherein, the second vibration mode is of the same order as the first vibration mode.

The invention according to claim 7 is a vibration actuator (10) according to any one of claim 1 to claim 6, wherein, the driving signal is an asymmetric waveform.

The invention according to claim 8 is a vibration actuator (10) according to any one of claim 1 to claim 6, wherein, the driving signal is an asymmetric waveform and the resonance frequency of the second vibration mode does not match the frequency of a higher harmonic that is an integer multiple of the driving frequency.

The invention according to claim 9 is a vibration actuator (10) according to any one of claim 1 to claim 6, wherein, the driving signal is a symmetric waveform and the second vibration mode does not match the frequency of a higher harmonic that is an odd-number multiple of the driving frequency.

The invention according to claim 10 is a vibration actuator (10) according to any one of claim 1 to claim 9, wherein, the vibrating element (11, 11A, 11B) is a substantially annular shape, the first vibration mode is a bending vibration, and the second vibration mode is a torsional vibration.

The invention according to claim 11 is the vibration actuator (10) according to any one of claim 1 to claim 9, wherein, the vibrating element (11, 11A, 11B) is a substantially annular shape and includes a brim-form flange portion (12c) that protrudes to an inner diametric side.

The invention according to claim 12 is the vibration actuator (10) according to any one of claim 1 to claim 11, further comprising: a frequency characteristic regulation portion (12d, 12e, 12f) that regulates a difference between the resonance frequency of the first vibration mode and the resonance frequency of the second vibration mode.

The invention according to claim 13 is the vibration actuator (10) according to claim 11, wherein, vibrating element (11, 11A, 11B) further comprising: a resilient body (12, 12A, 12B) and an electromechanical conversion element, which is joined to the resilient body, and the frequency characteristic regulation portion (12d, 12e, 12f) being provided at the resilient body.

The invention according to claim 14 is the vibration actuator according to claim 13, wherein, the frequency characteristic regulation portion is provided protruding from a surface joining of the resilient body with the electromechanical conversion element.

The invention according to claim 15 is the vibration actuator according to claim 12, wherein, the frequency characteristic regulation portion is provided at the vibrating element and is a portion that is provided in a direction parallel with a plane that includes a contact surface at which the vibrating element touches the relatively moving member.

The invention according to claim 16 is the vibration actuator according to any one of claim 12 to claim 15, wherein the frequency characteristic regulation portion is provided at a position near a neutral position of the first vibration mode of the vibrating element.

The invention according to claim 17 is the vibration actuator according to any one of claim 12 to claim 16, wherein the frequency characteristic regulation portion is provided at a position distant from a neutral position of the second vibration mode of the vibrating element.

The invention according to claim 18 is a lens barrel (3) provided with the vibration actuator (10) according to any one of claim 1 to claim 17.

The invention according to claim 19 is a camera system provided with the vibration actuator according to any one of claim 1 to claim 17.

The invention according to claim 20 is a vibrating element to be used in a vibration actuator (10), wherein the vibrating element: being able to vibrate in a first vibration mode, which is used for driving of the vibration actuator, and a second vibration mode, which is different from the first vibration mode, and the following relationship is satisfied $$fr2 \div m - fr1 \geq |fr3 - fr1| \times 0.4$$

(in which fr1 is a resonance frequency of the first vibration mode, fr2 is a resonance frequency of the second vibration mode, fr3 is a resonance frequency of the first vibration mode of the vibrating element neighboring fr1 at the high frequency side or low frequency side thereof, and m is an arbitrary integer).

The constitutions to which the reference numerals are assigned may be suitably modified, and at least portions thereof may be substituted with other constituents.

Effects of the Invention

According to the present invention, a vibration actuator capable of stable driving can be provided.

PREFERRED MODE FOR CARRYING OUT THE INVENTION

In the embodiment, the resonance frequency of a second vibration mode, which is different from a first vibration mode used for driving, is made not to match frequencies of higher harmonics of driving frequencies of a driving signal.

Embodiments

Herebelow, an embodiment of the vibration actuator will be described in detail with reference to the attached drawings.

For the present embodiment, an example of a vibration actuator which utilizes the ultrasonic vibration region will be described.

Figure 1:
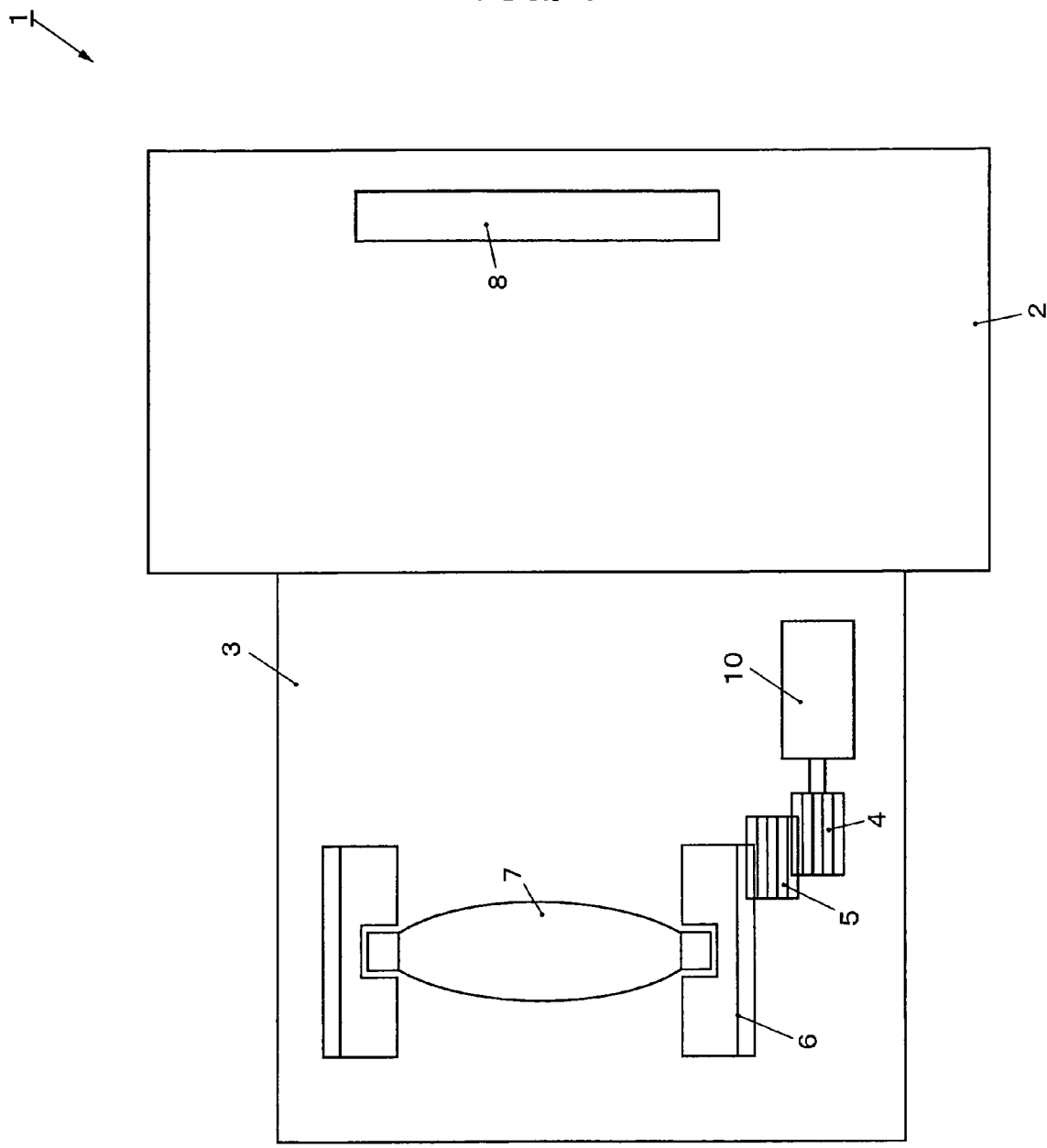
FIG. 1 is a diagram describing a camera system 1 according to a present embodiment.

FIG. 1 is a diagram describing a camera system 1 according to the present embodiment.

The present embodiment of the camera system 1 is provided with a camera body 2 including an imaging device 8, and a lens barrel 3 including a lens 7. The lens barrel 3 is an interchangeable lens which is detachable from the camera body 2. In the present embodiment, the lens barrel 3 illustrates an example that is an interchangeable lens but this is not limiting; for example, it may be a lens barrel that is integral with the camera body.

The lens barrel 3 is provided with a lens 7, a cam tube 6, gears 4 and 5, an ultrasonic motor 10 and so forth. In the present embodiment, the ultrasonic motor 10 is used as a drive source that drives the lens 7 when focus driving the camera system 1. The driving force provided from the ultrasonic motor 10 is transmitted to the cam tube 6 via the gears 4 and 5. The lens 7 is retained in the cam tube 6, and is a focusing lens that moves in an optical axis direction and implements focus point adjustment due to the driving force of the ultrasonic motor 10.

Figure 2:
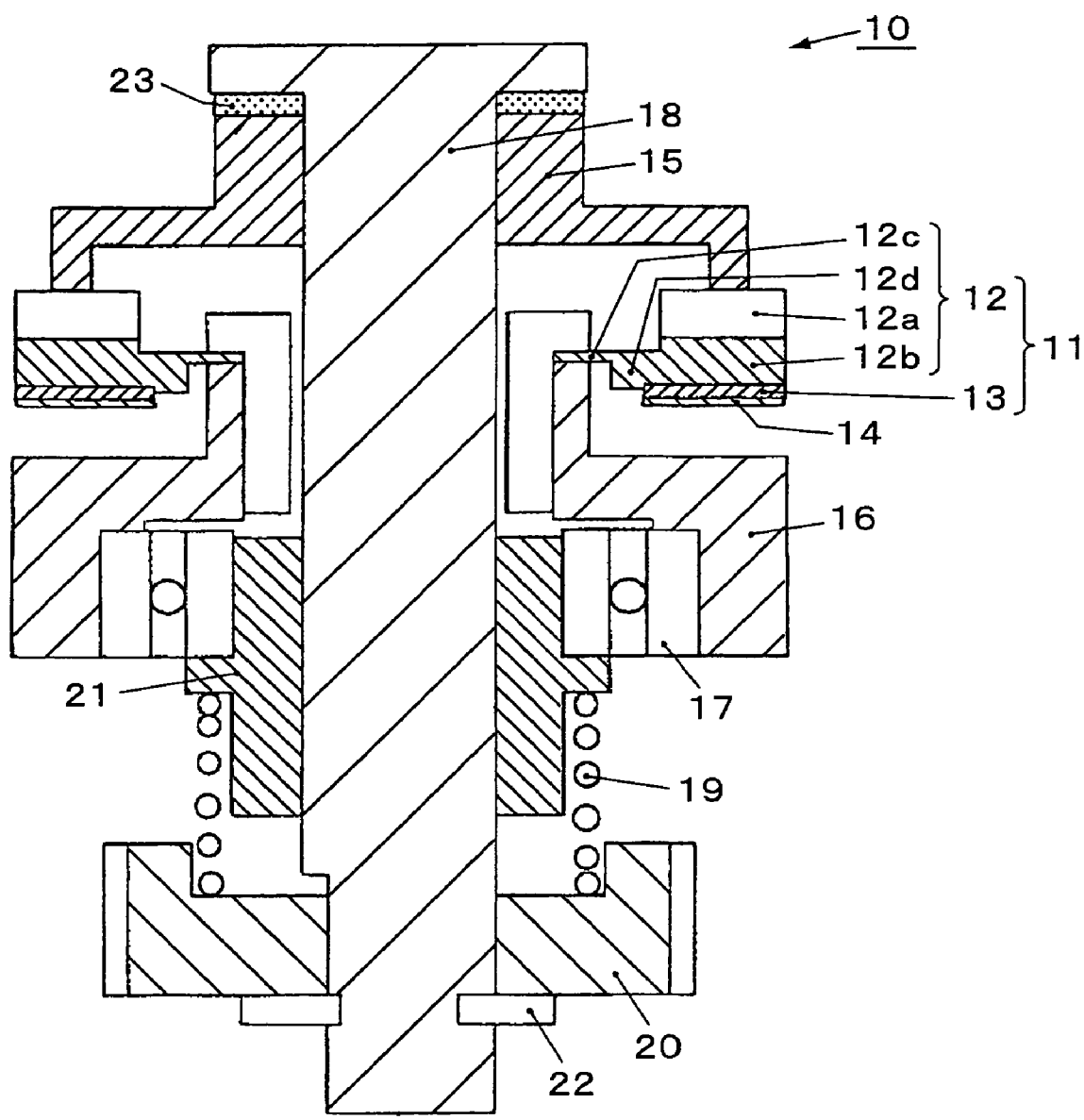
FIG. 2 is a cross-sectional diagram of an ultrasonic motor 10 of the present embodiment.

FIG. 2 is a sectional diagram of the ultrasonic motor 10 of the present embodiment.

The ultrasonic motor 10 of the present embodiment is provided with a vibrating element 11, a moving element 15, an output shaft 18, a pressure member 19 and so forth. It is fixed at the vibrating element 11 side thereof, and has a form in which the moving element 15 is rotatingly driven.

The vibrating element 11 is a member with a substantially annular shape, which includes a resilient body 12 and a piezoelectric body 13 that is joined to the resilient body 12.

The resilient body 12 is formed of a metallic material with large resonance sharpness, and the shape thereof is substantially annular. This resilient body 12 includes a combtooth portion 12a, a base portion 12b, a flange portion 12c and a protrusion portion 12d.

At the combtooth portion 12a, numerous grooves are formed by cutting into a face at a side thereof that is opposite from a face at which the piezoelectric body 13 is joined. Distal end faces of the combtooth portion 12a pressingly touch against the moving element 15, and form a driving face that drives the moving element 15. A lubricating surface treatment is applied to this driving face, such as Ni—P (nickel-phosphorus) plating or the like. The reason for providing the combtooth portion 12a is to bring a neutral plane of progressive vibration waves (hereinafter referred to as "progressive waves"), which occur at the driving face due to expansion and contraction of the piezoelectric body 13, as close as possible to the piezoelectric body 13 side, thus amplifying the amplitudes of the progressive waves at the driving face.

The base portion 12b is a portion that is continuous in the circumferential direction of the resilient body 12. The piezoelectric body 13 is joined to the face of the base portion 12b at the opposite side thereof from the combtooth portion 12a.

The protrusion portion 12d is at the inner diametric side of the base portion 12b, and is provided at the piezoelectric body 13 side relative to the flange portion 12c, which will be described later. In the present embodiment, the protrusion portion 12d is formed to protrude slightly from the face of joining with the piezoelectric body 13, so as to facilitate positioning when the piezoelectric body 13 is being joined. Details of this protrusion portion 12d will be described later.

The flange portion 12c is provided at the inner diametric side relative to the protrusion portion 12d, is a brim-form portion protruding in the inner diametric direction of the resilient body 12, and is disposed centrally in the thickness direction of the base portion 12b. The vibrating element 11 is fixed to a fixing member 16 by this flange portion 12c.

The piezoelectric body 13 is an electro-mechanical conversion element that converts electrical energy to mechanical energy. For example, a piezoelectric element, an electrostriction element or the like is used. The piezoelectric body 13 is divided, along the circumferential direction of the resilient body 12, into ranges into which driving signals of two phases (an A phase and a B phase) are inputted. For each phase, elements alternating in polarity are arranged in ½-wavelength units, and ¼-wavelength spaces are provided between the A phase and the B phase.

Wiring of a flexible printed circuit board 14 is connected to electrodes of the respective phases at the piezoelectric body 13. The piezoelectric body 13 expands and contracts due to driving signals supplied to the flexible printed circuit board 14 from amplification sections 104 and 105, which will be described later.

In the vibrating element 11, the progressive waves are generated at the driving face of the resilient body 12 by the expansion and contraction of the piezoelectric body 13. In the present embodiment, four progressive waves are generated.

The moving element 15 is formed of a light metal such as aluminum or the like, and is a member which is rotatingly driven by the progressive waves that occur at the driving face of the resilient body 12. The surface of the face of the moving element 15 that touches the vibrating element 11 (the driving face of the resilient body 12) is subjected to a surface treatment such as anodization or the like in order to improve abrasion resistance.

The output shaft 18 is a substantially cylindrical member. The output shaft 18 is provided with one end portion touching against the moving element 15, via a rubber member 23, so as to rotate integrally with the moving element 15.

The rubber member 23 is a substantially cylindrical member formed of rubber. This rubber member 23 has the function of making the moving element 15 and the output shaft 18 integrally rotatable, with viscoelasticity due to the rubber, and the function of absorbing vibrations, such that vibrations are not transmitted from the moving element 15 to the output shaft 18, and butyl rubber, silicon rubber, propylene rubber or the like is used.

The pressure member 19 is a member which generates a pressure force that pressingly touches the vibrating element 11 and the moving element 15 together, and is provided between a gear member 20 and a bearing holding member 21. In the present embodiment, the pressure member 19 employs a compression coil spring, but this is not a limitation.

The gear member 20 is inserted in so as to fit onto a D-cut of the output shaft 18, is fixed by a stopper 22 such as an E-ring or the like, and is provided so as to be integral with the output shaft 18 in the rotation direction and the axial direction. The gear member 20 transmits driving force to the gear 4 (see FIG. 1) by rotating along with rotation of the output shaft 18.

The bearing holding member 21 is disposed at the inner diametric side of a bearing 17 and the bearing 17 is disposed at the inner diametric side of the fixing member 16.

The pressure member 19 presses the vibrating element 11 toward the moving element 15 in the axial direction of the output shaft 18. By this pressure force, the moving element 15 is pressingly touched against the driving face of the vibrating element 11, and is rotatingly driven. A pressure regulation washer may be provided between the pressure member 19 and the bearing holding member 21, such that a suitable pressure force for driving of the ultrasonic motor 10 is obtained.

Figure 3:
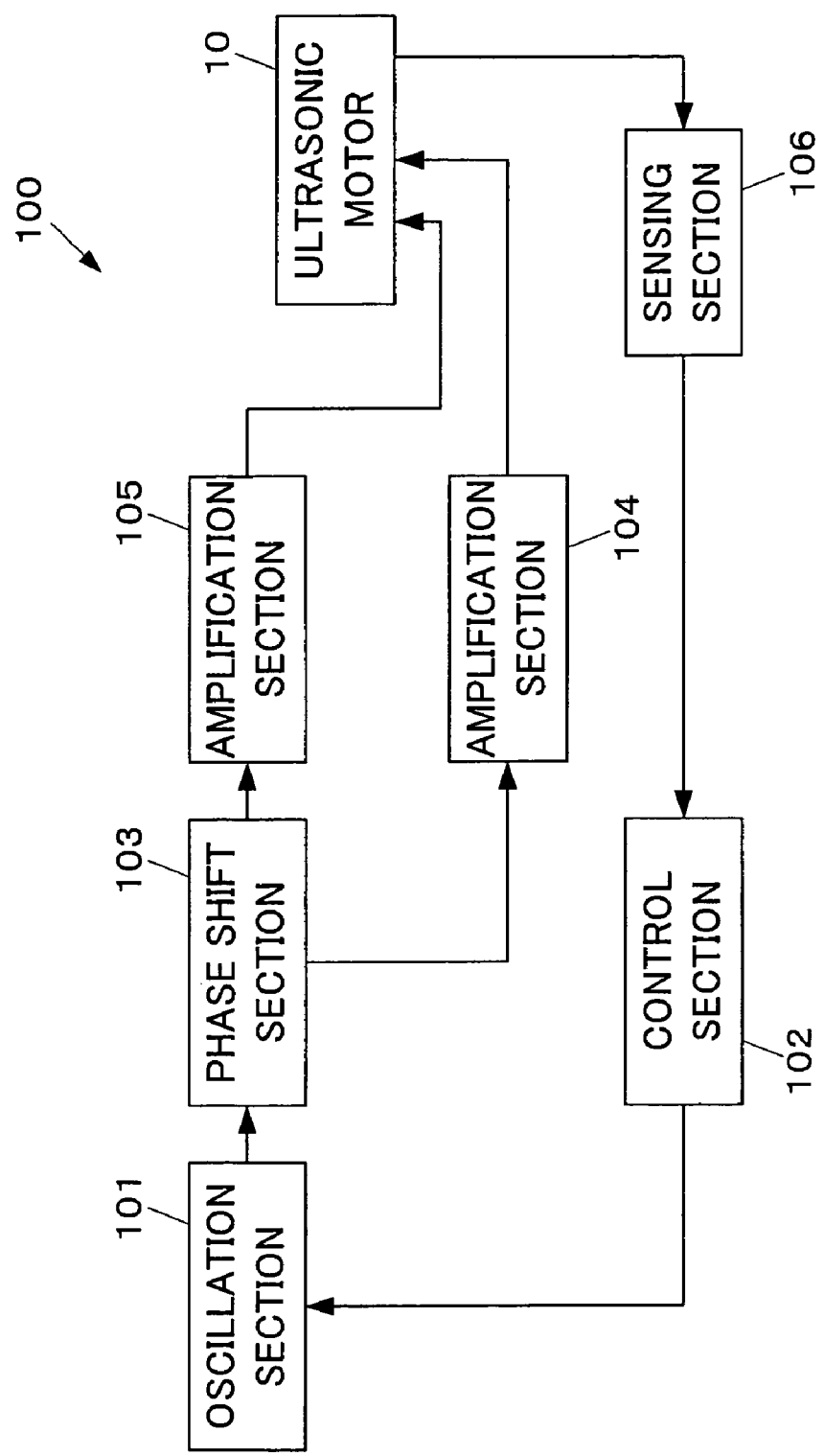
FIG. 3 is a block diagram describing a driving device 100 of the ultrasonic motor 10 of the present embodiment.

FIG. 3 is a block diagram describing a driving device 100 of the ultrasonic motor 10 of the present embodiment.

A vibration section 101 is a section that generates a driving signal of a required frequency due to instructions from a control section 102.

A phase shift section 103 is a section that divides the driving signal generated by the vibration section 101 into two driving signals which differ in phase by 90°.

The amplification sections 104 and 105 are sections that raise the voltages of the two driving signals which have been divided by the phase shift section 103 to respective required voltages.

Figure 4:
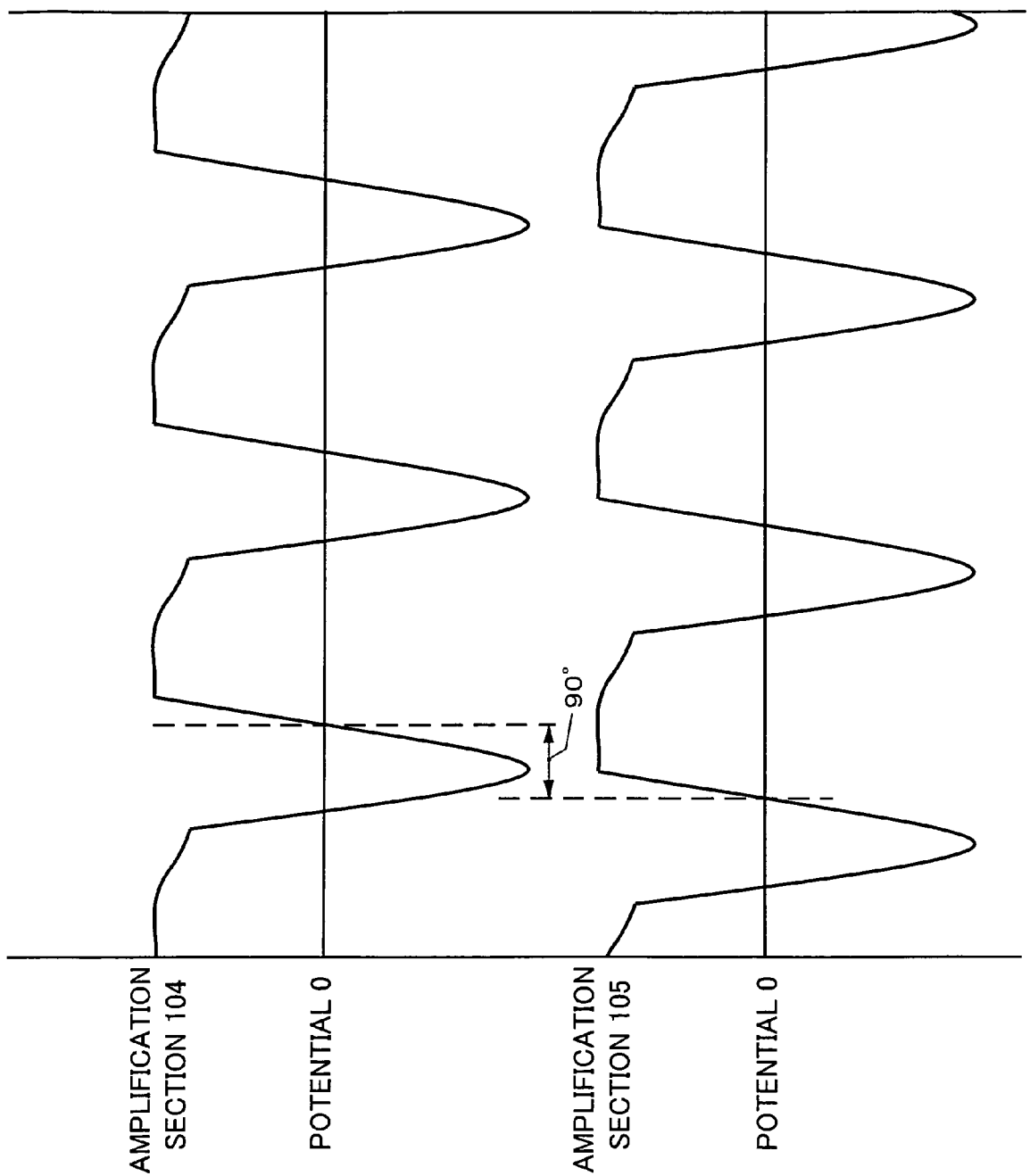
FIG. 4 is a diagram showing waveforms of driving signals that are used at the ultrasonic motor 10 of the present embodiment.

FIG. 4 is a diagram showing the waveforms of the driving signals that are used in the ultrasonic motor 10 of the present embodiment.

FIG. 4 is the driving signals that are outputted from the amplification sections 104 and 105 to the ultrasonic motor 10. As shown in FIG. 4, the waveforms of the two signals differing in phase by 90° are asymmetric waveforms which are asymmetrical between the positive direction and the negative direction of potential, when measured from zero potential.

As shown in FIG. 3, the driving signals from the amplification sections 104 and 105 are transmitted to the ultrasonic motor 10. The progressive waves are generated in the vibrating element 11 by the application of these driving signals, and drive the moving element 15.

A sensing section 106 is constituted of an optical encoder, a magnetic encoder or the like, and is a section that senses a position and speed of the lens 7 that is driven by driving of the moving element 15. In the present embodiment, the position and speed of the lens 7 are sensed by sensing a position and speed of the cam tube 6.

The control section 102 is a section that, on the basis of driving instructions from an unillustrated CPU provided in the camera body 2, controls the driving of the ultrasonic motor 10. The control section 102 receives sensing signals from the sensing section 106, and on the basis of values thereof, obtains position information and speed information, and controls the driving frequency of the driving signal generated by the vibration section 101 so as to position at a target position.

According to the structure of the present embodiment, the driving device 100 of the ultrasonic motor 10 operates as follows.

First, a target position is transmitted to the control section 102. A driving signal is generated from the vibration section 101, and from this signal, two driving signals which differ in phase by 90° are generated by the phase shift section 103, and are amplified to the required voltages by the amplification sections 104 and 105.

The driving signals are applied to the piezoelectric body 13 of the ultrasonic motor 10, the piezoelectric body 13 is excited, and a fourth-order bending vibration is generated in the resilient body 12 by this excitation. The piezoelectric body 13 is divided into the A phase and the B phase, and the driving signals are applied to the A phase and the B phase, respectively. The fourth-order bending vibration generated from the A phase and the fourth-order bending vibration generated from the B phase are offset by a positional phase of a ¼-wavelength, and the phase A driving signal and the phase B driving signal are offset by a 90° phase (see FIG. 4). Therefore, the two bending vibrations are combined and form four progressive waves.

Elliptical movements occur at the wave peaks of the progressive waves. Accordingly, the moving element 15 that is pressingly touched against the driving face of the resilient body 12 is frictionally driven by these elliptical movements.

The sensing section 106, which is an optical encoder or the like, senses the position and speed of the cam tube 6 that is driven by the driving of the moving element 15, and transmits them to the control section 102 in the form of electrical pulses. On the basis of these signals, the control section 102 can obtain the current position and current speed of the lens 7, and the driving frequency generated by the vibration section 101 is controlled on the basis of this position information and speed information and the target position information.

Now, in order to explain the reason for providing the protrusion portion 12d of the ultrasonic motor 10 of the present embodiment, a vibrating element that is not provided with the protrusion portion 12d and an ultrasonic motor that uses this vibrating element will be offered as a comparative example, and described in comparison with the present embodiment.

FIG. 5 is a diagram comparing cross-sectional shapes of the vibrating element 11 of the present embodiment with a vibrating element 51 according to the comparative example. FIG. 5A is a cross-sectional diagram showing the vibrating element 51 of the comparative example, and FIG. 5B is a cross-sectional diagram showing the vibrating element 11 of the present embodiment. FIG. 5C and FIG. 5D are cross-sectional diagrams showing vibrating elements 11A and 11B according to other embodiments. Herebelow, the vibrating element 51 of the comparative example in FIG. 5A and the vibrating element 11 of the present embodiment in FIG. 5B will be described.

The vibrating element 51 includes a substantially annular resilient body 52 and the piezoelectric body 13, which is joined to the resilient body 52. The flexible printed circuit board 14 is connected with the piezoelectric body 13. The resilient body 52 includes a combtooth portion 52a, a base portion 52b and a flange portion 52c.

The vibrating element 51 of the comparative example has substantially the same form as the vibrating element 11 of the present embodiment, and is used in a similar ultrasonic motor driven by the same driving signals as the ultrasonic motor 10 of the present embodiment, but differs from the vibrating element 11 of the present embodiment in that no protrusion portion is formed at the resilient body 52. Accordingly, the same reference numerals and reference numerals with the same suffixes will be applied to portions having similar functions, and duplicative descriptions will be omitted as appropriate.

Figure 6A:
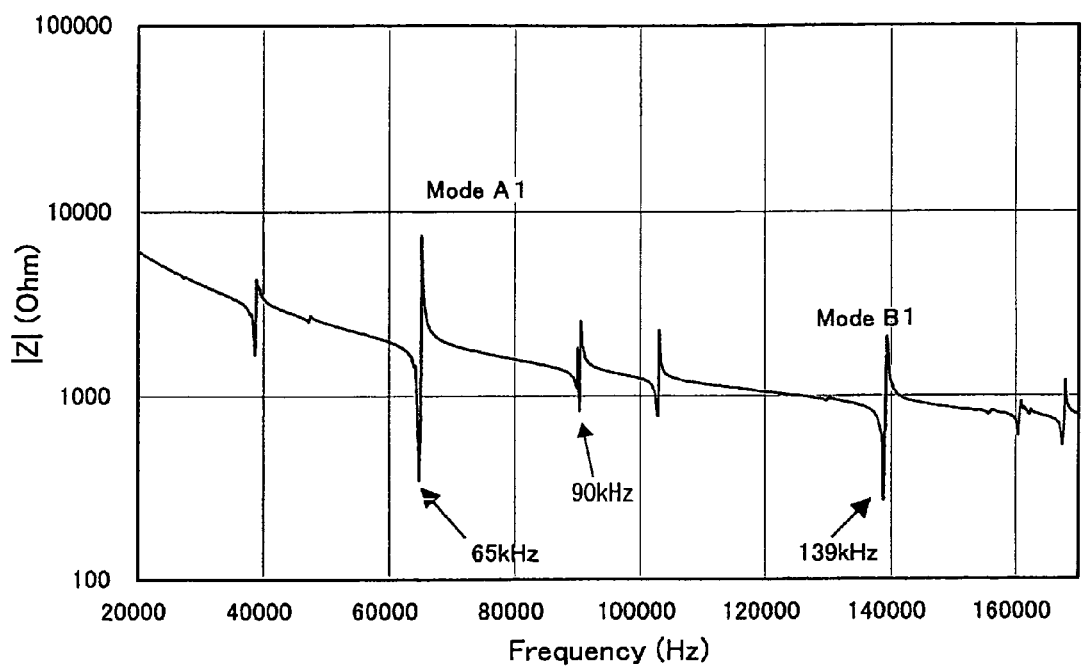
FIG. 6 is diagrams describing the natural vibration modes of vibrating elements.
Figure 6B:
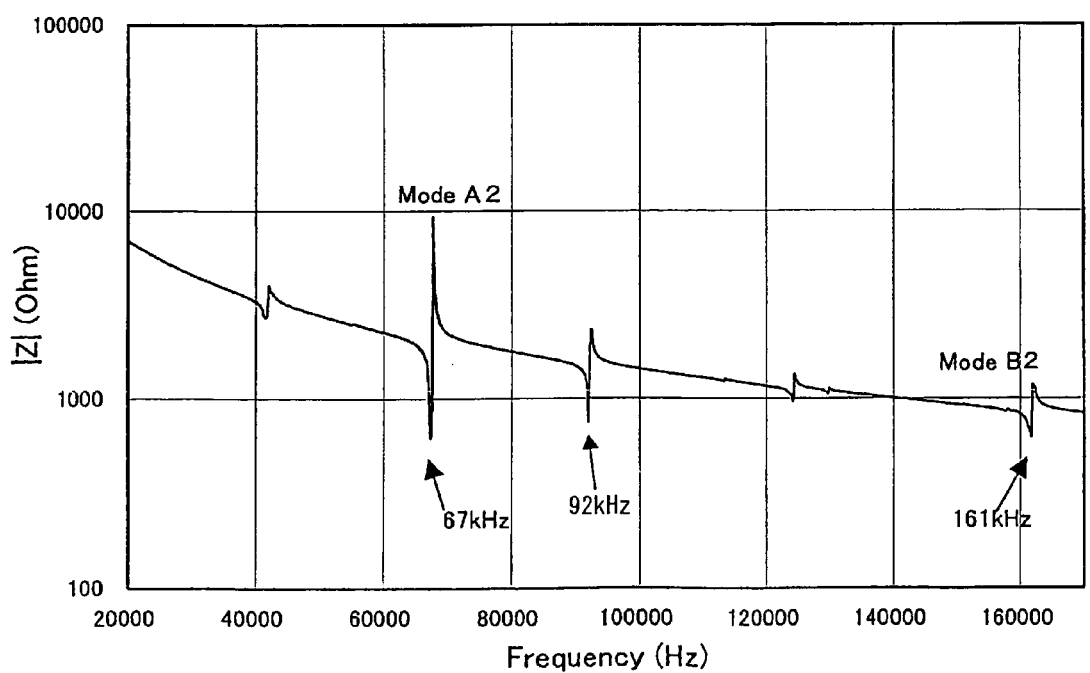

FIG. 6 is a diagram describing the natural vibration modes of vibrating elements. FIG. 6A shows the natural vibration modes of the vibrating element 51 of the comparative example and FIG. 6B shows the natural vibration modes of the vibrating element 11 of the present embodiment. In FIG. 6, the vertical axes are absolute values of impedance and the horizontal axes are frequencies.

As shown in FIG. 6, the vibrating element 51 of the comparative example has a vibration mode A1 with a resonance frequency of 65 kHz. This vibration mode A1 is a bending vibration in which peaks and troughs of bending are arranged in the direction in which the moving element is driven, that is, the circumferential direction of the resilient body 52, and is a fourth-order bending vibration in which four vibrations with the same period occur in the resilient body 52.

The vibrating element 51 of the comparative example also has a vibration mode B1, which is a vibration mode different from the vibration mode A1, in a frequency region corresponding to about twice the resonance frequency of the vibration mode A1. This vibration mode B1 is a fourth-order torsional vibration, and the resonance frequency thereof is 139 kHz. This fourth-order torsional vibration is concentric with the resilient body 52 and is a torsional vibration in which an imaginary circle, which passes through a substantially central position of width in the radial direction of the resilient body 52 and passes through a vicinity of the neutral plane of the aforementioned fourth-order bending vibration, vibrates about a torsion center. Four vibrations occur in the resilient body 52.

In the ultrasonic motor, a predetermined frequency region, at the high frequency side or low frequency side relative to the resonance frequency of the vibration mode used for driving, is used for driving signals in the form of a region of driving frequencies to be used for driving (hereinafter referred to as a driving band). The reason for providing width to the driving frequencies which serve as the driving band is to enable alteration of the rotary speed of the moving element and control of the ultrasonic motor, by enabling alterations of driving frequency within the driving band.

In the ultrasonic motor 10 of the present embodiment and the ultrasonic motor that uses the vibrating element of the comparative example 51, the high frequency side of the resonance frequency of the vibration mode used for driving is used as the driving band.

Figure 7A:
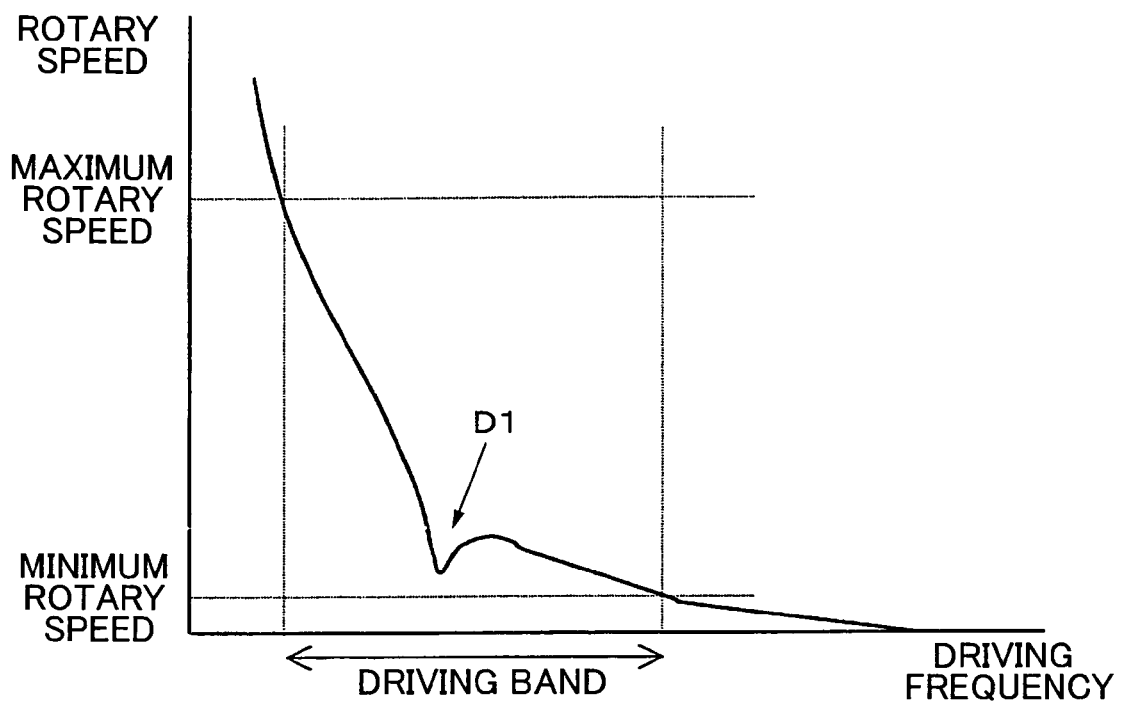
FIG. 7 is diagrams showing the relationship between the rotary speeds and driving frequencies of vibrating elements.
Figure 7B:
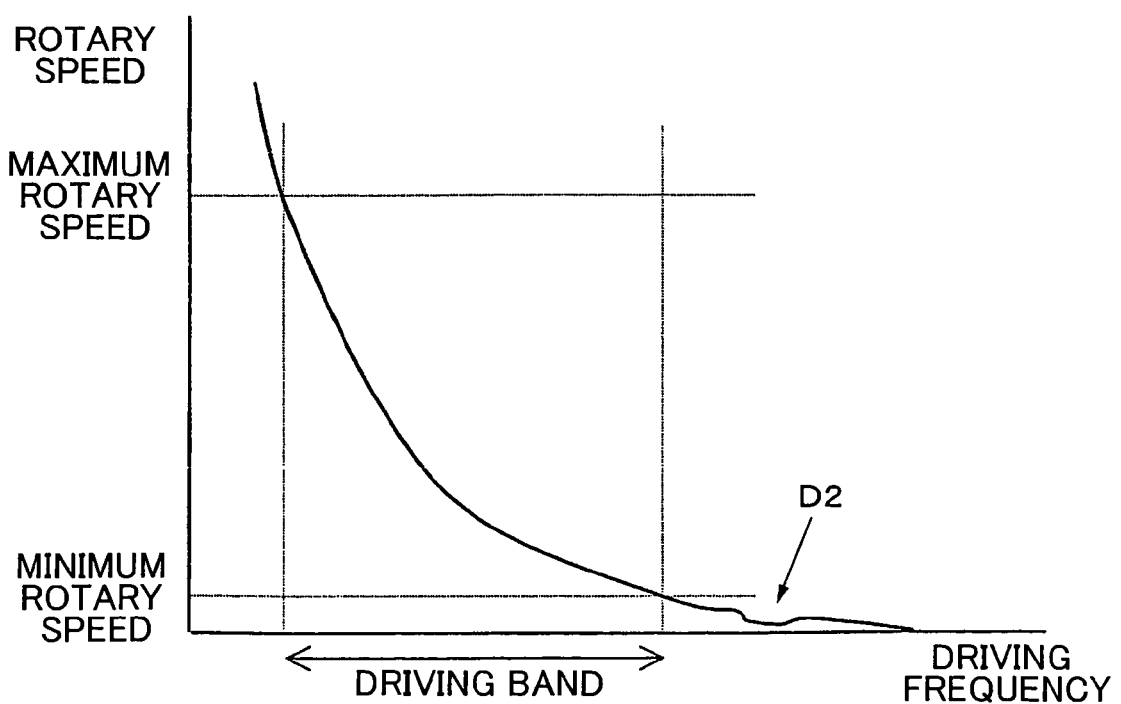

FIG. 7 is diagrams showing relationships between rotary speeds and driving frequencies of the moving elements. FIG. 7A is an example of an ultrasonic motor using the vibrating element 51 of the comparative example, and FIG. 7B is an example of the ultrasonic motor 10 using the vibrating element 11 of the present embodiment. In FIG. 7, the vertical axes are rotary speeds of the moving elements and the horizontal axes are driving frequencies.

To vibrate the vibrating element 51 of the comparative example in vibration mode A1, a driving signal with an asymmetric waveform the same as in the present embodiment is applied. When the driving signal is frequency-swept in the driving band required for driving, as shown in FIG. 7A, a frequency region D1 in which the rotary speed suddenly changes occurs (hereinafter referred to as a discontinuous region). If this discontinuous region D1 occurs in the driving band, driving of the ultrasonic motor is unstable, and control thereof is difficult.

Now, in order to explain a reason why the discontinuous region D1 occurs, the driving signals used for driving of the ultrasonic motors will be described.

In general, it is ideal to use a sine wave for the driving signal driving an ultrasonic motor. If a driving signal is a sine wave, then when this driving signal is frequency-analyzed, only a single frequency is a detected frequency. Therefore, when a sine wave driving signal is applied to an ultrasonic motor, only vibrations of a vibration mode with a resonance frequency at a frequency close to the driving frequency of the driving signal are generated. Therefore, driving of the ultrasonic motor is stable, and control is easy to perform.

However, when an ultrasonic motor is mounted in an interchangeable lens, a camera system or the like, because space for mounting of the driving circuit and suchlike is limited, it is difficult to apply a driving signal that is an ideal sine wave to the ultrasonic motor. Therefore, a driving signal uses a symmetric waveform such as a rectangular wave or the like, or a waveform such as an asymmetric waveform as shown in FIG. 4 or the like.

Figure 8A:
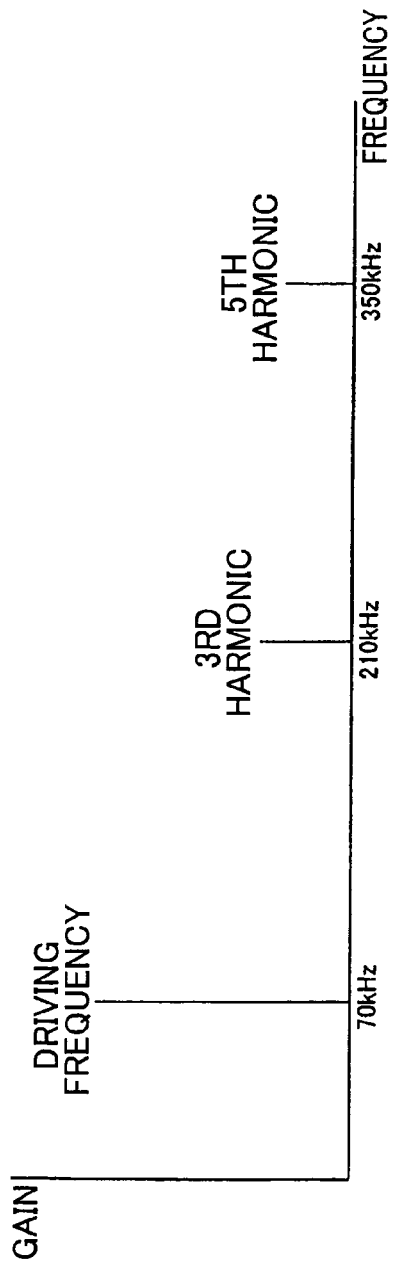
FIG. 8 is diagrams showing the relationship between waveforms and higher harmonics of driving signals.
Figure 8B:
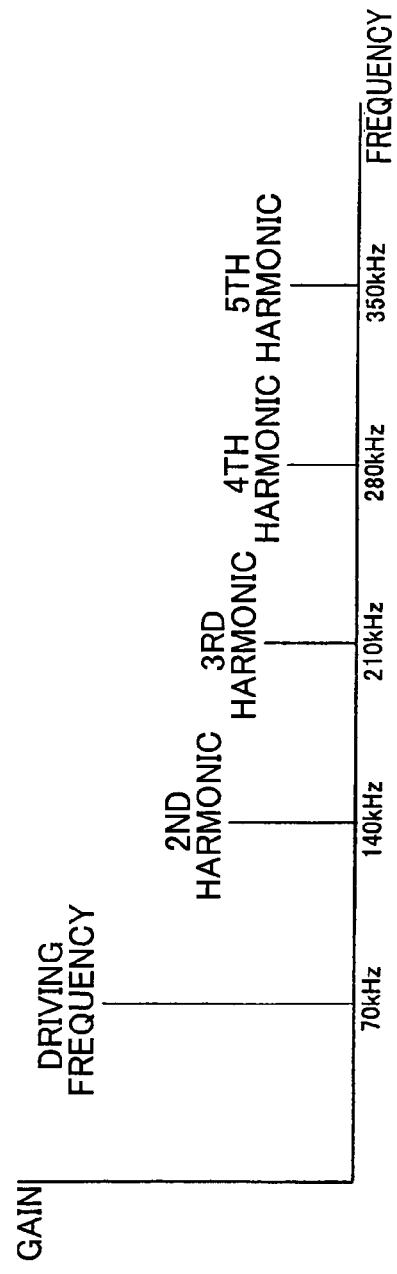

FIG. 8 is diagrams showing relationships between waveforms and higher harmonics of driving signals. In FIG. 8, the vertical axes are gains and the horizontal axes are frequencies. FIG. 8A shows a case in which the waveform of a driving signal is a symmetric signal (for example, a rectangular wave), and FIG. 8B shows a case in which the waveform of a driving signal is an asymmetric signal.

When, for example, the waveform of a driving signal is a symmetric waveform about zero potential, such as a rectangular wave, a sawtooth wave or the like, and this driving signal is frequency-analyzed, then as shown in FIG. 8A, beside the driving frequency (the frequency used for driving, which is 70 kHz in FIG. 8A), higher harmonics with frequency values which are odd-number multiples of the driving frequency are detected: a higher harmonic frequency at three times the driving frequency (210 kHz), a higher harmonic frequency at five times the driving frequency (350 kHz), and so forth.

Further, when the waveform of a driving signal is an asymmetric waveform about zero potential and this driving signal is frequency-analyzed, then as shown in FIG. 8B, beside the driving frequency (70 kHz in FIG. 8B), higher harmonics with frequency values which are integer multiples of the driving frequency are detected: a higher harmonic frequency at two times the driving frequency (140 kHz), a higher harmonic frequency at three times the driving frequency (210 kHz), and so forth.

In other words, a driving signal with a symmetric waveform includes, in addition to the driving frequency, higher harmonic frequencies which are odd-number multiples of the driving frequency, and a driving signal with an asymmetric waveform includes, in addition to the driving frequency, higher harmonic frequencies which are integer multiples of the driving frequency.

Therefore, when a driving signal applied to an ultrasonic motor is a symmetric waveform such as a rectangular wave, a sawtooth wave or the like, if the vibrating element has, in addition to the vibration mode used for driving, a vibration mode with a resonance frequency close to the frequency of a higher harmonic that is an odd-number multiple of the driving frequency, then, in addition to the vibration mode used for driving, the vibration mode with the resonance frequency close to the higher harmonic frequency at the odd-number multiple of the driving frequency is excited by the higher harmonics of the driving frequency included in the driving signal.

Further, when a driving signal applied to an ultrasonic motor is an asymmetric waveform, if the vibrating element has, in addition to the vibration mode used for driving, a vibration mode with a resonance frequency close to the frequency of a higher harmonic that is an integer number multiple of the driving frequency, then, in addition to the vibration mode used for driving, the vibration mode with the resonance frequency close to the higher harmonic frequency at the integer multiple of the driving frequency is excited by the higher harmonics of the driving frequency included in the driving signal.

Therefore, when an ultrasonic motor is driven using a driving signal with a symmetric waveform such as a rectangular wave, a sawtooth wave or the like or an asymmetric waveform, if the frequency of a higher harmonic included in the driving signal and the resonance frequency of a vibration mode that is not used for driving the ultrasonic motor have values that are close, then, beside the vibrations used for driving, unnecessary vibrations that are not used for driving are also generated and superimposed, progressive waves are disrupted, and failures in driving of the ultrasonic motor may occur.

Considering the case of the above-described comparative example, the asymmetric waveform driving signal that is applied to the ultrasonic motor that uses the vibrating element 51 of the comparative example (see FIG. 8B) includes a higher harmonic frequency (140 kHz) at twice the driving frequency (70 kHz), which is close to the resonance frequency (139 kHz) of vibration mode B1 (see FIG. 6A). Therefore, when the driving signal is frequency-swept within the driving band, the vibration mode B1 which is not used for driving is excited by the higher harmonic at twice the driving frequency, propagation of driving force from the progressive waves of the vibrating element 51 to the moving element is impeded, the discontinuous region D1 as shown in FIG. 7A arises, and driving is not stable.

Figure 5A:
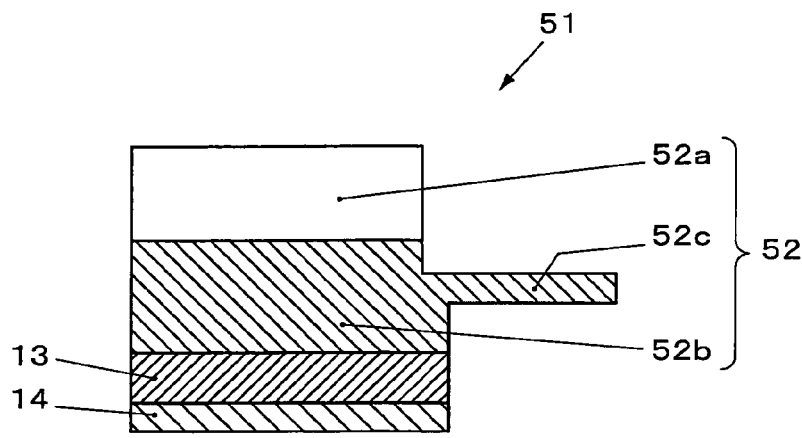
FIG. 5 is diagrams comparing the cross-sectional shapes of vibrating elements 11, 11A and 11B of the present embodiment with a vibrating element 51 according to a comparative example.
Figure 5B:
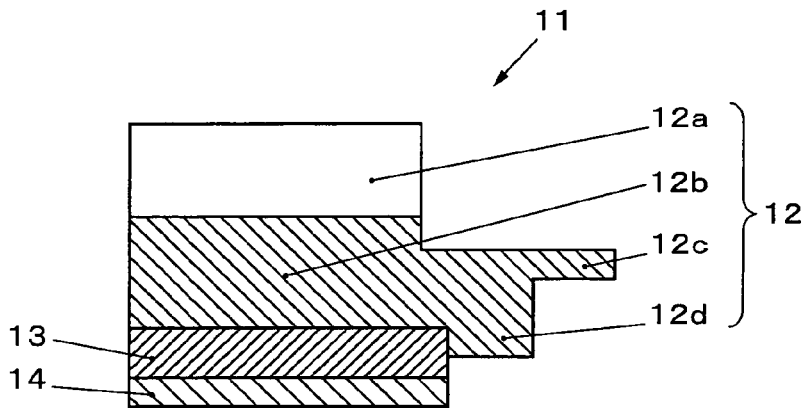

On the other hand, with the vibrating element 11 of the ultrasonic motor 10 of the present embodiment, as shown in FIG. 5B, the protrusion portion 12d is provided at the resilient body 12 of the vibrating element 11. As shown in FIG. 6B, this vibrating element 11 has the vibration mode A2 and the vibration mode B2.

Vibration mode A2 is a fourth-order bending vibration similar to vibration mode A1, and the resonance frequency thereof is 67 kHz. Vibration mode B2 is a fourth-order torsional vibration similar to vibration mode B1, and the resonance frequency thereof is 161 kHz.

When a driving signal with an asymmetric waveform is applied to the ultrasonic motor 10 in order to vibrate the vibrating element 11 in vibration mode A2 and the driving frequency is frequency-swept within the driving band required for driving, then as shown in FIG. 7B, no discontinuous region occurs in the driving band, and the ultrasonic motor 10 provides stable driving.

This is because, as shown in FIG. 6B, the resonance frequency of vibration mode B2 is shifted by the provision of the protrusion portion 12d, to the high frequency side compared to the comparative example in which the protrusion portion 12d is not provided.

The protrusion portion 12d is at the inner diametric side of the resilient body 12 and is provided at the piezoelectric body 13 side relative to the center of thickness of the resilient body 12. This is a position which is close to the neutral plane of the fourth-order bending vibration of vibration mode A2, which is used for driving, and distant from the neutral axis of the fourth-order torsional vibration of vibration mode B2. By provision at this position, the resonance frequency of vibration mode B2 can be altered to a frequency that is not affected by the higher harmonic frequency at twice the driving frequency. The resonance frequency of vibration mode A2 which is used for driving is also altered, but the alteration amount thereof is small and is within a range that has no effect on driving.

Therefore, although the driving signal applied to the ultrasonic motor 10 is an asymmetric waveform as shown in FIG. 4 and includes the higher harmonic frequency at twice the driving frequency, the resonance frequency of vibration mode B2 (161 kHz) is at a position which is distant from the higher harmonic frequency (140 kHz) at twice the driving frequency. Therefore, the vibration mode B2 is hardly excited at all. Furthermore, as shown in FIG. 7B, although the discontinuous region D2 due to the vibration mode B2 does occur, this is for a case of performing a frequency sweep of the driving signal outside the driving band. Within the driving band, the ultrasonic motor 10 can be stably driven.

Now, for there not to be any effect on the vibration mode used for driving, it is sufficient for the resonance frequency of a vibration mode that is not used for driving to be a frequency that is not excited by a higher harmonic of the driving frequency when the driving signal is frequency-swept within the driving band.

If this condition is to be expressed by a mathematical expression, it is sufficient for the following expression to be satisfied-if the resonance frequency of a vibration mode A used for driving is fra, the resonance frequency of a vibration mode B that is not used for driving is frb, a resonance frequency of vibration mode A that neighbors fra is frc, and, with an arbitrary integer being m, a higher harmonic that excited vibration mode B is an m-th higher harmonic.

$$frb \div m - fra \geq |frc - fra| \times 0.4 \quad \text{expression (1)}$$

The left side of this expression represents a difference between the resonance frequency of vibration mode A and 1/m of the resonance frequency of vibration mode B.

The right side of this expression represents the width of a driving band used for driving, which is 0.4 times the difference between the resonance frequency of vibration mode A that is used for driving (the fourth-order mode of bending) and a resonance frequency neighboring the resonance frequency of vibration mode A (a fifth-order mode of bending). As shown in FIG. 6A, with the vibrating element 51 of the comparative example, the resonance frequency frc is 90 kHz, and as shown in FIG. 6B, with the vibrating element 11 of the present embodiment, it is 92 kHz.

In the present embodiment and the comparative example, the driving signal is an asymmetric waveform, and the vibration mode which is excited by the higher harmonic at twice the driving frequency has an effect on driving of the ultrasonic motor. Thus, if m is set to 2, and values of the resonance frequencies are substituted into the above-described expression (1) in relation to the vibrating element 51 of the comparative example:

The right side=139÷2−65=4.5 (kHz)
and the left side=|90−65|×0.4=10 (kHz)

Thus, expression (1) is not satisfied and vibration mode B1 will be excited by the higher harmonic frequency at twice the driving frequency.

In contrast, with the vibrating element 11 of the present embodiment:

The right side=161÷2−67=13.5 (kHz)
and the left side=|92−67|×0.4=10 (kHz)

Thus, expression (1) is satisfied and vibration mode B2 will be not excited by the higher harmonic frequency at twice the driving frequency.

Therefore, with the ultrasonic motor 10 of the present embodiment, as shown in FIG. 7B, the discontinuous region D1 does not occur within the driving band as with the ultrasonic motor that uses the vibrating element 51 of the comparative example, and stable driving is possible.

Hereabove, the vibrating element 11 of FIG. 5B has been described. However, the same effects as with the vibrating element 11 are also present if a vibrating element 11A of FIG. 5C or a vibrating element 11B of FIG. 5D is used. Similarly to the vibrating element 11, the vibrating element 11A and the vibrating element 11B are structures in which a protrusion portion is provided to the vibrating element of the comparative example 51, but the positions at which the protrusion portions are provided differ from the vibrating element 11.

Figure 5C:
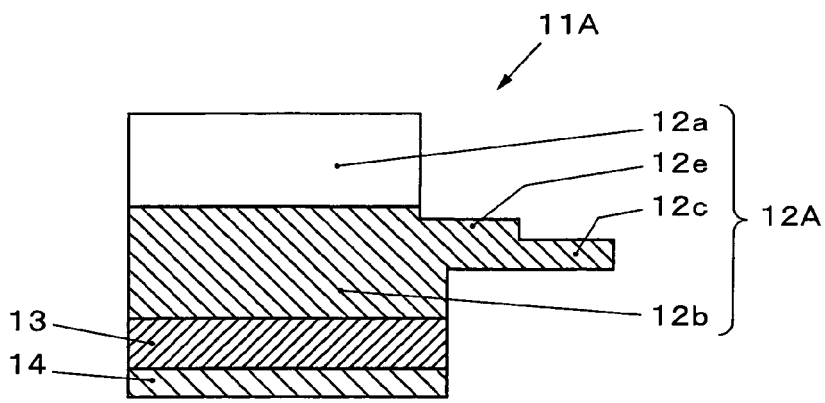
Figure 5D:
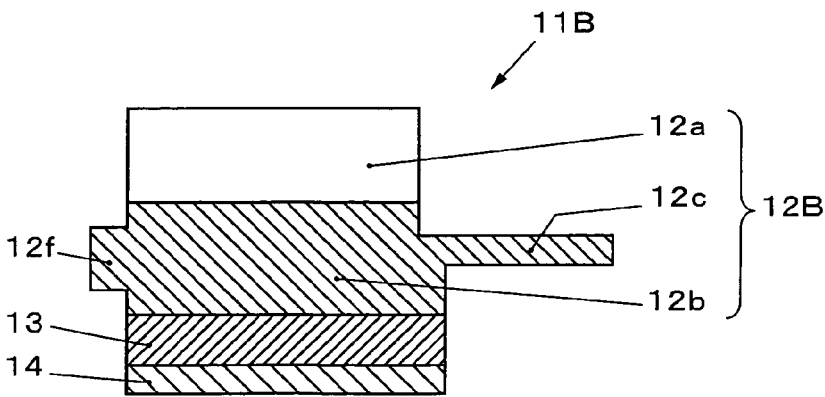

In the vibrating element 11A of FIG. 5C, a protrusion portion 12e is provided at the base portion 12b of the resilient body 12A. The protrusion portion 12e is at the inner diametric side of the base portion 12b, and is provided at the combtooth portion 12a side of the flange portion 12c. In the vibrating element 11B of FIG. 5D, a protrusion portion 12f is provided at the outer periphery side of the base portion 12b of a resilient body 12B. The positions at which the protrusion portions 12e and 12f are provided, similarly to the protrusion portion 12d of FIG. 5B, are positions that are close to the neutral plane of the fourth-order bending vibration of vibration mode A2, which is used for driving, and distant from the neutral axis of the fourth-order torsional vibration of vibration mode B2. By provision at these positions, similarly to the case of using the vibrating element 11 of FIG. 5, the resonance frequency of vibration mode B2 can be altered to a frequency that is not affected by the higher harmonic frequency at twice the driving frequency.

The vibrating elements of FIGS. 5B to 5D may be produced in their respective shapes by mechanical machining. On the other hand, a vibrating element of a shape of FIGS. 5B to 5D may be fabricated by fabricating a vibrating element without a protrusion portion as in the comparative example of FIG. 5A, fabricating a member with an annular shape corresponding to the protrusion portion of FIGS. 5B to 5D, and sticking the two together. In this manner, vibrating elements of numerous types may be fabricated by sticking any protrusion portion onto the vibrating element of FIG. 5A.

As described above, in the ultrasonic motor 10 of the present embodiment, when the driving signal that is applied is an asymmetric waveform and the driving signal is frequency-swept in the driving band, frequencies of higher harmonics that are integer multiples of the driving frequency do not overlap with resonance frequencies of vibration modes that are not used for driving.

Therefore, if a driving signal with a symmetric waveform, such as a rectangular wave or the like, were to be applied to the ultrasonic motor 10 of the present embodiment, the ultrasonic motor 10 of the present embodiment would be able to drive stably. This is because the higher harmonic frequencies included in a driving signal with an asymmetric waveform are higher harmonic frequencies at odd-number multiples of the resonance frequency, and when the driving signal is frequency-swept in the driving band for the ultrasonic motor 10 of the present embodiment, the frequencies of higher harmonics at integer multiples of the resonant frequency, which include the odd-number multiples of the resonance frequency, do not overlap with the frequency of a vibration mode that is not used for driving.

According to the present embodiment, a vibration mode that is not used for driving is not excited by higher harmonic frequencies of driving frequencies, and an ultrasonic motor capable of stable driving can be formed.

Moreover, it is sufficient just to form the protrusion portion 12d. Simple realization without large scale changes of shape is possible.

Variant Examples

The above-described embodiment is not limiting; various modifications and alterations are possible, and they fall within the scope of equivalents of the present invention.

(1) For the present embodiment, an example has been illustrated in which the protrusion portion 12d is provided to alter the value of the resonance frequency of the vibration mode that is not used for driving. However, this is not limiting; for example, a recess portion may be provided. Furthermore, even without a protrusion portion or recess portion being provided, it is sufficient that, when the driving signal is frequency-swept in the driving band, higher harmonic frequencies of driving frequencies of the vibration mode used for driving do not overlap with a resonance frequency of a vibration mode that is not used for driving.

(2) For the present embodiment, an example has been illustrated in which the driving signal driving the ultrasonic motor 10 is an asymmetric waveform. However, this is not limiting; for example, a signal with a symmetric waveform that is symmetrical with reference to zero potential, such as a rectangular wave, a sawtooth wave or the like, is also possible. In such a case, the higher harmonics included in the driving signal are higher harmonic frequencies at odd-number multiples of the driving frequency. Therefore, it is acceptable if the value of m in expression (1) is set to an odd integer.

(3) For the present embodiment, an example has been illustrated in which the vibration mode A that is used for driving the ultrasonic motor 10 is a fourth-order bending vibration. However, this is not limiting. Provided the above-described expression (1) is satisfied, it may be, for example, another order and it may be another vibration, such as a torsional vibration, a longitudinal vibration or the like.

(4) For the present embodiment, an example has been illustrated in which, in the vibrating element 11, 11A or 11B, the resilient body 12 includes the flange portion 12d, 12e or 12f. However, this is not limiting; a vibrating element that includes a substantially annular resilient body without a flange portion is also possible.

(5) For the present embodiment, an example has been illustrated in which the piezoelectric body 13 is an electromechanical conversion element that converts electrical energy to mechanical energy. However, this is not limiting; an element that converts other energy, such as light, heat or the like, to mechanical energy may be used.

(6) For the present embodiment, the ultrasonic motor 10 that uses vibrations in the ultrasonic region has been given as an example and described. However, this is not limiting; a vibration actuator that uses vibrations outside the ultrasonic region may be applied.

(7) For the present embodiment, an example has been illustrated in which the camera system 1 is provided with the imaging device 8 and photography is performed with the imaging device 8. However, this is not limiting; for example, photographs may be taken using film.

(8) For the present embodiment, an example has been illustrated in which the ultrasonic motor 10 is provided in the camera system 1 and is used in a driving section that carries out focusing operations. However, this is not limiting; for example, it may be used in a driving section that carries out zoom operations. Further, it may also be used in a driving section of a photocopier, a driving section of a steering wheel-tilting device or a headrest in a car, or the like.

The invention claimed is:

1. A vibration actuator comprising:
a vibrating element that vibrates due to a driving signal; and
a relatively moving member that performs relative motion with respect to the vibrating element due to the vibrations, wherein
the vibrating element is able to vibrate in a first vibration mode, which is used for driving of the relatively moving member, and in a second vibration mode, which is a vibration mode different from the first vibration mode, and
a resonance frequency of the second vibration does not match a frequency of a higher harmonic of a driving frequency of the driving signal for driving the vibrating element in the first vibration mode.

2. The vibration actuator according to claim 1, wherein a resonance frequency of the second vibration mode does not overlap with a region in which the frequency of the higher harmonic alters when the driving frequency is altered within a driving frequency region that is used for driving of the relatively moving member.

3. The vibration actuator according to claim 1, wherein the following relationship is satisfied $$fr2 \div m - fr1 \geq |fr3 - fr1| \times 0.4$$

(in which $fr1$ is a resonance frequency of the first vibration mode, $fr2$ is the resonance frequency of the second vibration mode, $fr3$ is a resonance frequency of the first vibration mode of the vibrating element neighboring $fr1$ at the high frequency side or low frequency side thereof, and m is an arbitrary integer).

4. The vibration actuator according to claim 3, wherein m=2.

5. The vibration actuator according to claim 3, wherein the following relationship is satisfied $$fr2 \div m - fr1 \geq 10 \text{(unit: kHz)}.$$

6. The vibration actuator according to claim 1, wherein the second vibration mode is of the same order as the first vibration mode.

7. The vibration actuator according to claim 1, wherein the driving signal is an asymmetric waveform.

8. The vibration actuator according to claim 1, wherein the driving signal is an asymmetric waveform, and the resonance frequency of the second vibration mode does not match the frequency of a higher harmonic that is an integer multiple of the driving frequency.

9. The vibration actuator according to claim 1, wherein the driving signal is a symmetric waveform, and the second vibration mode does not match the frequency of a higher harmonic that is an odd-number multiple of the driving frequency.

10. The vibration actuator according to claim 1, wherein the vibrating element is a substantially annular shape, the first vibration mode is a bending vibration, and the second vibration mode is a torsional vibration.

11. The vibration actuator according to claim 1, wherein the vibrating element is a substantially annular shape and includes a brim-form flange portion that protrudes to an inner diametric side.

12. The vibration actuator according to claim 11, the vibrating element further comprising:
a resilient body and an electromechanical conversion element, which is joined to the resilient body, and the frequency characteristic regulation portion being provided at the resilient body.

13. The vibration actuator according to claim 12, wherein the frequency characteristic regulation portion is provided protruding from a surface joining of the resilient body with the electromechanical conversion element.

14. The vibration actuator according to claim 1, further comprising:
a frequency characteristic regulation portion that regulates a difference between the resonance frequency of the first vibration mode and the resonance frequency of the second vibration mode.

15. The vibration actuator according to claim 14, wherein the frequency characteristic regulation portion is provided at the vibrating element and is a portion that is provided in a direction parallel with a plane that includes a contact surface at which the vibrating element touches the relatively moving member.

16. The vibration actuator according to claim 14, wherein the frequency characteristic regulation portion is provided at a position near a neutral position of the first vibration mode of the vibrating element.

17. The vibration actuator according to claim 14, wherein the frequency characteristic regulation portion is provided at a position distant from a neutral position of the second vibration mode of the vibrating element.

18. A lens barrel provided with the vibration actuator according to claim 1.

19. A camera system provided with the vibration actuator according to claim 1.

20. A method for driving a vibration actuator comprising:
vibrating a vibrating element due to a driving signal; and
relatively moving a relatively moving member with respect to the vibrating element due to the vibrations; wherein
the vibrating element is able to vibrate in a first vibration mode, which is used for driving of the relatively moving member, and in a second vibration mode, which is a vibration mode different from the first vibration mode, and
a resonance frequency of the second vibration does not match a frequency of a higher harmonic of a driving frequency of the driving signal for driving the vibrating element in the first vibration mode.

21. The method for driving a vibration actuator according to claim 20, wherein
a resonance frequency of the second vibration mode does not overlap with a region in which the frequency of the higher harmonic alters when the driving frequency is altered within a driving frequency region that is used for driving of the relatively moving member.

22. The method for driving a vibration actuator according to claim 20, wherein the following relationship is satisfied $$fr2 \div m - fr1 \geq |fr3 - fr1| \times 0.4$$

(in which fr1 is a resonance frequency of the first vibration mode, fr2 is the resonance frequency of the second vibration mode, fr3 is a resonance frequency of the first vibration mode of the vibrating element neighboring fr1 at the high frequency side or low frequency side thereof, and m is an arbitrary integer).

23. The method for driving a vibration actuator according to claim 22, wherein m=2.

24. The method for driving a vibration actuator according to claim 22, wherein the following relationship is satisfied $$fr2 \div m - fr1 \geq 10 \text{(unit: kHz)}.$$

25. The method for driving a vibration actuator according to claim 20, wherein
the second vibration mode is of the same order as the first vibration mode.

26. The method for driving a vibration actuator according to claim 20, wherein
the driving signal is an asymmetric waveform.

27. The method for driving a vibration actuator according to claim 20, wherein
the driving signal is an asymmetric waveform, and
the resonance frequency of the second vibration mode does not match the frequency of a higher harmonic that is an integer multiple of the driving frequency.

28. The method for driving a vibration actuator according to claim 20, wherein
the driving signal is a symmetric waveform, and
the second vibration mode does not match the frequency of a higher harmonic that is an odd-number multiple of the driving frequency.

29. The method for driving a vibration actuator according to claim 20, wherein
the vibrating element is a substantially annular shape,
the first vibration mode is a bending vibration, and
the second vibration mode is a torsional vibration.

30. The method for driving a vibration actuator according to claim 20, wherein
the vibrating element is a substantially annular shape and includes a brim-form flange portion that protrudes to an inner diametric side.

31. The method for driving a vibration actuator according to claim 30, the vibrating element further comprising:
a resilient body and an electromechanical conversion element, which is joined to the resilient body, and wherein the frequency characteristic regulation portion is provided at the resilient body.

32. The method for driving a vibration actuator according to claim 31, wherein
the frequency characteristic regulation portion is provided protruding from a surface joining of the resilient body with the electromechanical conversion element.

33. The method for driving a vibration actuator according to claim 20, further comprising:
a frequency characteristic regulation portion that regulates a difference between the resonance frequency of the first vibration mode and the resonance frequency of the second vibration mode.

34. The method for driving a vibration actuator according to claim 33, wherein
the frequency characteristic regulation portion is provided at the vibrating element and is a portion that is provided in a direction parallel with a plane that includes a contact surface at which the vibrating element touches the relatively moving member.

35. The method for driving a vibration actuator according to claim 33, wherein
the frequency characteristic regulation portion is provided at a position near a neutral position of the first vibration mode of the vibrating element.

36. The method for driving a vibration actuator according to claim 33, wherein
the frequency characteristic regulation portion is provided at a position distant from a neutral position of the second vibration mode of the vibrating element.

* * * * *